United States Patent [19]

Yoshida

[11] Patent Number: 4,627,396
[45] Date of Patent: Dec. 9, 1986

[54] INTAKE CONTROL SYSTEM OF ENGINE

[75] Inventor: Takumori Yoshida, Iwata, Japan

[73] Assignee: Yamaha Hatsudoki Kabushiki Kaisha, Iwata, Japan

[21] Appl. No.: 356,811

[22] Filed: Mar. 10, 1982

[30] Foreign Application Priority Data

Mar. 12, 1981 [JP] Japan ................... 56-34558

[51] Int. Cl.⁴ .......................................... F02M 35/10
[52] U.S. Cl. .................... 123/302; 123/308; 123/442; 123/586; 123/432
[58] Field of Search ............ 261/64 R; 123/302, 308, 123/52 MB, 442, 586, 432

[56] References Cited

U.S. PATENT DOCUMENTS

| 2,028,585 | 1/1932 | Blake et al. | 123/442 |
| 3,721,428 | 3/1973 | Gelé et al. | 123/442 |
| 4,232,640 | 11/1980 | Matsumoto et al. | 123/336 |
| 4,243,001 | 1/1981 | Yamada | 123/442 |
| 4,300,504 | 11/1981 | Tezuka | 123/442 |
| 4,317,438 | 3/1982 | Yagi et al. | 123/308 |

Primary Examiner—Ira S. Lazarus
Attorney, Agent, or Firm—Ernest A. Beutler

[57] ABSTRACT

An embodiment of an induction system for internal combustion engines that permits maximum power output while at the same time insuring good running at low speeds without loss in mid-range torque. Independent intake passages communicate with each chamber of the engine. A throttle valve arrangement is included that includes a first manually operated throttle valve positioned in a common portion of the intake passages, a second manually operated throttle valve that is positioned in the first intake passage between the first throttle valve and the chamber, and a third throttle valve positioned in the second intake passage between the first throttle valve and the chamber. A linkage system interconnects the first and second throttle valves so that the second throttle valve is opened at a predetermined degree of opening of the first throttle valve. The linkage causes the first and second throttle valves to reach their fully opened position simultaneously. The third throttle valve is automatically positioned in response to intake system vacuum.

17 Claims, 3 Drawing Figures

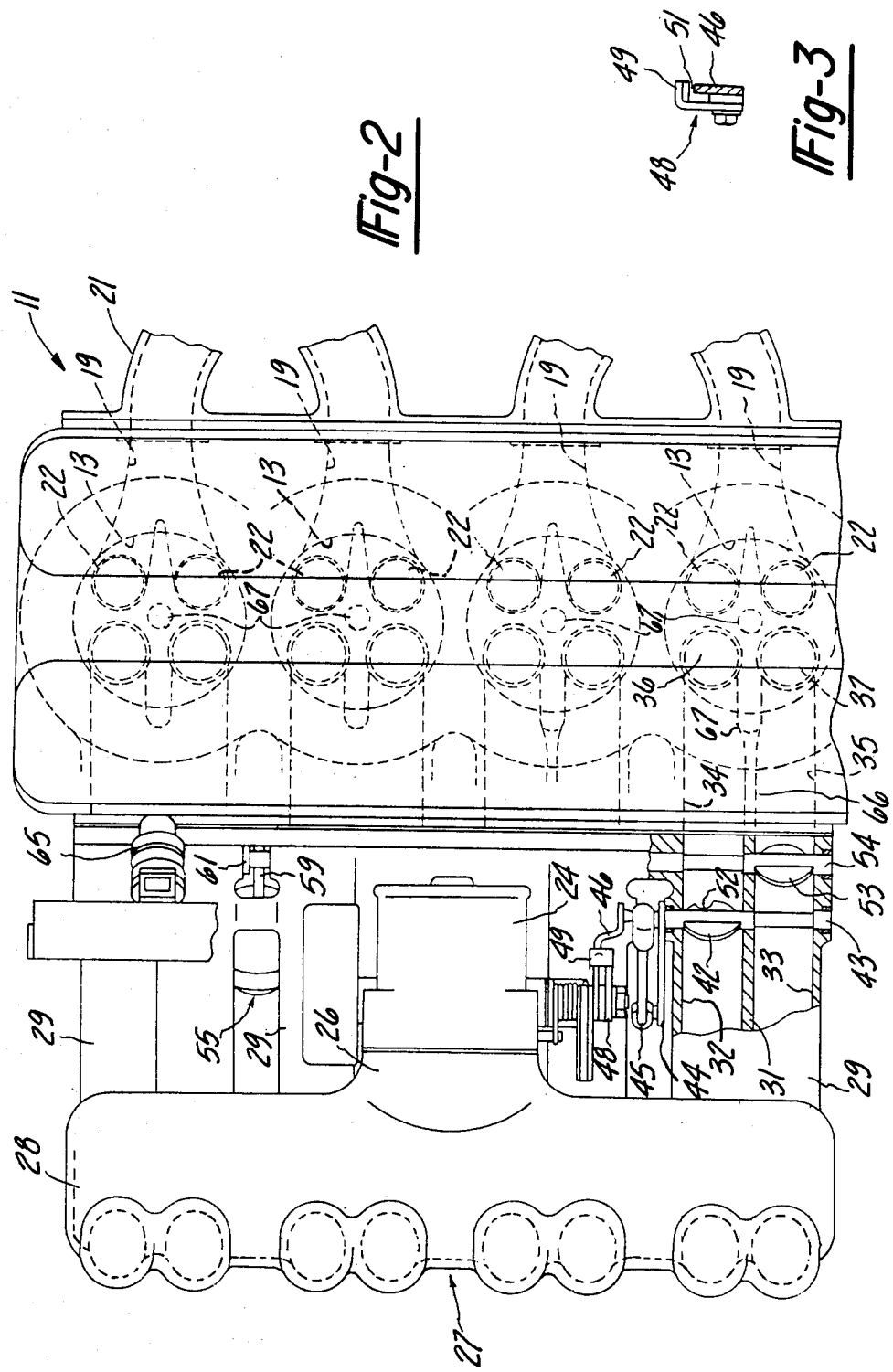

INTAKE CONTROL SYSTEM OF ENGINE

BACKGROUND OF THE INVENTION

This invention relates to an intake control system for engines and more particularly to an improved induction system for internal combustion engines.

It has been proposed to increase the power output of an internal combustion engine by providing multiple intake passages, each serving the same chamber of the engine. By virtue of the use of such multiple intake passages the volumetric efficiency at wide open throttle may be improved, and, accordingly, maximum power output can be achieved. However, the use of such multiple intake passages provides problems with low speed running. That is, the gas velocity through the increased induction passage area is so slow at low and mid-range speeds that poor performance is encountered. Therefore, it has been proposed to provide some form of throttle valve arrangement for controlling the flow through the intake passages so that less than the maximum effective area is employed at low speed running. Such an arrangement increases the gas velocity at low speeds and can significantly improve low speed running. Examples of such arrangments are shown in Japanese Patent SHO 47-32850, Japanese published utility model application SHO 54-97620, and Japanese laid open patent application SHO 55-551920. It has been found, however, with the previously proposed throttle controlling mechanisms that performance is deteriorated at at least certain running conditions. For example, it has been found that the previously proposed throttle controlling actually result in a reduction in mid-range torque due to the fact that the throttle controlling arrangement restricts air flow under these conditions. It has been found that the throttle valve control is not sufficient to avoid the generation of pulsations in the intake system under this running condition which pulsations reduce charging efficiency and provide a loss in mid-range torque. Furthermore, the previously proposed throttle valve arrangements may actually result in some decreases in low speed torque as well.

It is, therefore, a principal object of this invention to provide an improved induction system for an internal combustion engine.

It is a further objection of the invention to provide an induction system that improves the torque characteristics throughout the entire engine speed and load ranges.

It is another object of this invention to provide an improved throttle valve arrangement for an engine having an induction system consisting of multiple intake passages for each chamber of the engine.

It is yet a further object of this invention to provide a throttle valve arrangement for a multiple intake passage induction system that improves the torque throughout the engine speed and load ranges.

SUMMARY OF THE INVENTION

A first feature of this invention of adapted to be embodied in an induction system for an internal combustion engine having a chamber and first and second intake passages that communicate with the chamber. The intake passages have a common portion upstream of their communication with the chamber and a first manually operated throttle valve is positioned in the common portion of the intake passages. In accordance with this feature of the invention, a second manually operated throttle valve is positioned in the first intake passage between the first manually operated throttle valve and the chamber. Linkage means control the position of the second throttle valve in response to the position of the first manually operated throttle valve. A third throttle valve is positioned in the second intake passage between the first manually operated throttle valve and the chamber. Means are provided for automatically operating the third throttle valve.

Another feature of the invention is also adapted to be embodied in an induction system for an internal combustion engine having first and second intake passage that communicate with the same chamber of the engine as defined in the preceding paragraph. In accordance with this feature of the invention, a first manually operated throttle valve is positioned in a common portion of the intake passages and a second manually operated throttle valve is positioned in the first intake passage. The second throttle valve has a normal, partially opened position in which a predetermined degree of flow is permitted. Linkage means interconnect the first and second throttle valves for opening the second throttle valve when the first throttle valve is opened to an amount that exceed the permissible flow through the initial opening of the second throttle valve.

BRIEF DESCRIPTION OF THE DRAWINGS

FIG. 2 is a top plan view of the embodiment shown in FIG. 1, with portions broken away.

FIG. 3 is a cross-sectional view taken along the line 3—3 of FIG. 1.

DETAILED DESCRIPTION OF THE PREFERRED EMBODIMENT

Figure 1:
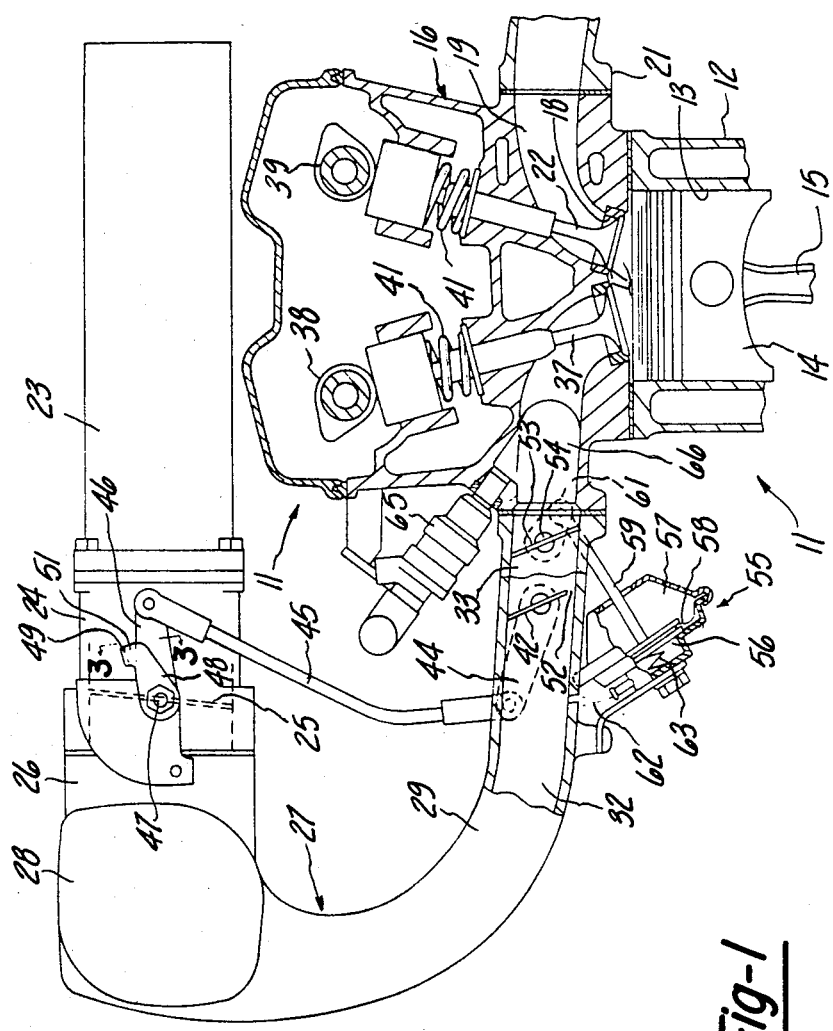
FIG. 1 is a partial side elevational view of an engine constructed in accordance with an embodiment of the invention, with portions shown in section and other portions removed.

The reference numeral 11 indicates generally a four-cylinder, in-line, four-cycle reciprocating engine constructed in accordance with a first embodiment of the invention. Although the invention is described in conjunction with an engine of this cylinder number and configuration, it is believed readily apparent to those skilled in the art that the invention is susceptible of use with engine of other types. Furthermore, certain features of the invention are not limited to utility with with reciprocating engines.

The engine 11 includes a cylinder block 12 having cylinder bores 13 in which pistons 14 are supported for reciprocation. The pistons 14 are coupled by means of connecting rods 15 to a crankshaft (not shown) for driving the crankshaft in a known manner.

A cylinder head, indicated generally by the reference numeral 16, is affixed in a suitable manner to the cylinder block 12. The cylinder head 16 is formed with recesses 17 that cooperate with each of the cylinder bores 13 and pistons 14 to form the engine chambers. At times the recesses 17 will be referred to as the combustion chambers.

A pair of exhaust ports 18 are formed on one side of the cylinder head 16 and extend from each of the combustion chambers to an exhaust passage 19 which in turn communicates with an exhaust manifold 21. Exhaust valves 22 cooperate with the exhaust ports 18 so as to control the communication between the chamber 17 and the exhaust passages 19.

The engine 11 has an induction system that includes an intake device 23 which may comprise an air cleaner or the like and which communicates with a main throttle valve assembly 24. The main throttle valve assembly 24 comprises a valve body in which a manually operated throttle valve 25 is positioned for controlling the flow into an inlet 26 of an intake manifold, indicated generally by the reference numeral 27. The inlet 26 communicates with a plenum chamber 28 having runners 29 formed for each of the cylinders 13. Each runner 29 is divided by a wall 31 into a primary intake passage 32 and a secondary intake passage 33. The manifold intake passages 32 and 33 communicate respectively with primary and secondary cylinder head intake passages 34 and 35. The cylinder head intake passages 34 and 35 terminate at respective intake ports in which intake valves 36 and 37, respectively, are provided for controlling the flow to the combustion chamber 17.

The intake valves 36 and 37 are operated by an overhead intake cam shaft 38 in a known manner. In a like manner the exhaust valves 22 are operated by an exhaust cam shaft 39, which is also supported in the cylinder head 16. The cam shafts and 38 and 39 are driven in a known manner and operate the intake valves 36, 37 and exhaust valves 22 in opposition to the action of the return springs 41, as is well known in this art.

A plurality of second, manually operated throttle valves 42 are provided, each of which is supported in a respective one of the intake manifold primary induction passages 32. The second throttle valves 42 are affixed to respective throttle valve shafts 43 with the throttle valve shafts 43 of each manifold runner 29 being connected together in a suitable manner for simultaneous rotation.

A lever arm 44 is affixed to one of the throttle valve shafts 43 and has a pivotal connection to one end of an actuating link 45. The opposite end of the link 45 has a pivotal connection to a throttle actuating lever 46 that is rotatably journaled on a throttle valve shaft 47 of the main, manually operated throttle valve 25. The lever 46 is juxtaposed to a second lever 48 that is affixed against rotation relative to the shaft 47 and which has a tang 49 that is juxtaposed to a cam surface 51 of the throttle control lever 46. When the arrangement is in its normal idle position, as will be described, the tang 49 is spaced from the throttle lever surface 51 by a predetermined gap to effect a lost motion connection between the levers 48 and 46.

Each of the second manually operated throttle valves 42 is provided with a relief or notch 52 that is sized so as to permit a predetermined degree of air flow, even when the throttle valves 42 are in their fully closed position. The sizing and effectiveness of the notches 52 will be described later.

A control valve 53 is positioned in each of the manifold secondary induction passages 33 for controlling the flow therethrough. The control valves 53 are all connected to a common shaft 54 and are adapted to be opened by means of an actuating device indicated generally by the reference numeral 55, in a manner to be described. The control device 55 consists of an outer housing that is divided into a vacuum chamber 56 and an atmospheric chamber 57 by means of a diaphragm 58. A control rod 59 is affixed to the diaphragm 58 and is pivotally connected at one end to a lever 61 that is affixed to the control valve shaft 54. The atmospheric chamber 57 is continuously exposed to atmospheric pressure by means of the clearance between the housing and the control rod 59. The vacuum chamber 56 senses induction system vacuum in the primary manifold intake passage 32 by means of a conduit 62. A spring 63 is positioned in the vacuum chamber 56 for urging the diaphragm 58 to a position wherein the control valves 53 wil be opened when the pressure in the atmospheric chamber 57 and vacuum chamber 56 are substantially equal.

A fuel injection nozzle 65 is provided for each of the cylinders 13. Each fuel injection nozzle 65 is supported by the cylinder head 16 and is positioned so as to discharge into an area 66 where the cylinder head intake passage 34 and 35 communicate with each other. The communication area 66 is provided by an opening in a wall 67 of the cylinder head 16 which separates the passages 34 and 35 from each other for at least a portion of their length. The interconnecting opening 66 is positioned relatively close to the intake valves 36 and 37.

The figures show the engine 11 with the throttle valves 25, 42 and 53 as they appear when the engine is operating at idle. In this position the idle air flow passes through the partially open primary throttle valve 25 and flows into the main cylinder head intake passage 34 through the reliefs 52 in the throttle valves 42. As a result there will be a high velocity imparted to the intake charge due to the shape and location of the throttle valve reliefs 52. This high velocity charge will enter the chambers 16 through the intake valves 36 when they are opened. The high velocity of the intake charge will insure turbulence in the combustion chamber 17 that promotes rapid flame propagation, even at idle. Thus, good combustion will occur when a spark plug 67 positioned in each chamber 17 is fired.

As the primary throttle valve 25 is gradually opened by the operator to increase engine speed, the tang 49 will approach the throttle control lever surface 51. However, during a predetermined degree of initial opening, the throttle valves 42 will be held in their closed position. The intake charge will still, therefore, be delivered at a high velocity through the reliefs 52.

The lost motion connection afforded between the tang 49 and surface 51 is such that at the time the effective area of the notch 52 is of insufficient size so as to permit sufficient air flow to the chambers 17, the throttle valves 42 will begin to be opened by rotation of the control levers 56. Thus, the intake charge will be delivered through the partially opened throttle valves 42 and a smooth and effective torque curve will be generated.

During all of the described operation of the throttle valves 25 and 42, there will be sufficient intake manifold vacuum exerted so that the atmospheric pressure in the chamber 57 will overcome the action of the spring 63 and the diaphragm 58 will be urged to a position wherein the control valves 53 are closed. This condition will be maintained until nearly wide open throttle is reached.

As the engine speed continues to increase because of opening of the throttle valves 25 and 42, eventually a point will be reached when the intake valves 36 of the primary intake passages offer sufficient resistance that the full charge cannot be delivered through the intake valves 36. At this time a portion of the intake charge will be delivered to the chamber 17 through the passages 66 and secondary cylinder head intake passages 35. Without the interconnecting passageway 66 it has been found that there will be a reduction in engine torque under the running condition that exists when the resistance to flow of the intake valve 36 is such that sufficient intake charge cannot be delivered through only this passage.

Eventually a point will be reached where the intake manifold vacuum exerted through the conduit 62 will be insufficient to hold the control valves 53 in their closed position. When this occurs, the spring 63 will urge the diaphragm 58 to a position wherein the control valves 53 are opened. Additional charge flow will then be provided to the chamber 17 through the manifold secondary intake passages 33 and the cooperating cylinder head intake passages 35. As a result maximum power is achieved without sacrificing running characteristics at low and mid ranges. The throttle valve linkage is such that the manually operated throttle valves 42 of the main induction system intake passages 32 reach their fully opened position at the same time the main throttle valve 25 reaches its fully opened position.

It is believed apparent to those skilled in the art that each embodiment of the invention provides an arrangement wherein extremely good low speed running may be accomplished while at the same time maximum power achieved. Furthermore, the use of the communication port 66 permits good mid-range torque. In an engine having only a single intake passage serving each chamber, the torque falls off as engine speed increases beyond a certain point due to the restriction of the intake system to maximum charging efficiency. In an engine having both primary and secondary intake systems but not communicating passageway the mid-range torque actually decreases due to the restriction of the engine intake valve in the primary passage. Under this running condition pulsations are induced in the intake system that reduce charging efficiency. In order to compensate for this problem with previously proposed engines having multiple intake passages serving each chamber, it has been the practice to open the control valves at a fairly early point. The opening of the control valves has the effect of eliminating the restriction in the intake air flow, however, the large effective cross-sectional area causes very low velocities through the intake system in mid-range running and poor combustion results. With this invention, however, the communication passage 66 significantly increases the mid-range torque without inducing unduly low air flow velocities. Because of the use of this port, it is possible to hold the control valves 53 in a closed position during a larger proportion of the engine running. This insures high intake charge velocities that improves the turbulence in the combustion chamber and, accordingly, combustion efficiency and smooth running. At the same time, however, maximum power can be achieved when the control valves 53 are opened due to the significantly increased effective area of the induction system.

The described construction also permits the use of a single throttle valve for controlling the idle air flow that is positioned upstream of the individual runners in a common portion. As a result of this arrangement, charge distribution between the various cylinders at low speed is greatly improved.

In addition to the aforenoted advantages, by providing a curvature or C-shape to the induction system it is possible to locate the main throttle valve 25 above the auxiliary manually operated throttle valves 42 so as to improve compactness of the engine and to simplify the interconnecting linkage.

Although a preferred embodiment of the invention has been disclosed, it is believed to be within the scope of those skilled in the art to use further embodiments of the invention without departing from the spirit and scope thereof, as defined by the appended claims.

I claim:

1. In an induction system for a internal combustion engine comprising a chamber, a first intake passage communicating with said chamber, a second intake passage communicating with said chamber, said intake passages having a common portion upstream of their communication with said chamber, and a first manually operated throttle valve in said common portion of said intake passages, the improvement comprising a second manually operated throttle valve in said first intake passage between said first manually operated throttle valve and said chamber, linkage means for controlling the position of said second manually operated throttle valve in response to the position of said first manually operated throttle valve, a third throttle valve in said second induction passage between said first throttle valve and said chamber, and means for automatically operating said third throttle valve.

2. An induction system as set forth in claim 1 wherein the second throttle valve provides an air flow area when the first and second throttle valves are in their idle position.

3. An induction system as set forth in claim 2 wherein the linkage means permits a predetermined degree of opening of the first manually operated throttle valve before the second manually operated throttle valve is opened.

4. An induction system as set forth in claim 3 wherein the linkage means is effective to cause the first and second manually operated throttle valves to reach their fully opened position simultaneously.

5. An induction system as set forth in any of claims 1 through 4 wherein the second throttle valve is formed with a relief therein for permitting a predetermined flow therepassed when the second throttle valve is in a fully closed position.

6. An induction system as set forth in claim 5 wherein a connection passage extends between the first and second intake passages downstream of the second and third throttle valves.

7. An induction system as set forth in claim 5 wherein the intake passages are provided with a reversely bent portion so that the first throttle valve is juxtaposed to the second throttle valve and the flow past the first throttle valve is in the opposite direction to the flow past the second throttle valve.

8. An induction system as set forth in any of claims 1 through 4 wherein the means for automatically operating the third throttle valve is responsive to the pressure in the induction system at a predetermined location.

9. An induction system as set forth in claim 8 wherein a connection passage extends between the first and second intake passages downstream of the second and third throttle valves.

10. An induction system as set forth in claim 8 wherein the intake passages are provided with a reversely bent portion so that the first throttle valve is juxtaposed to the second throttle valve and the flow past the first throttle valve is in the opposite direction to the flow past the second throttle valve.

11. In an induction system for an internal combustion engine comprising a chamber, a first intake passage communicating at its downstream end with said chamber through a first intake port, a second intake passage communicating at its downstream end with said chamber through a second intake port independent of said first intake port, said intake passages having a common portion upstream of their communication with said chamber, and a first manually operated throttle valve in said common portion of said intake passages, the improvement comprising means for causing the primary portion of the idle and low speed charge requirements of said chamber to enter said chamber through said first intake port, including a second manually operated throttle valve positioned in said first intake passage for controlling the flow therethrough, said second manually operated throttle valve having a relief formed therein for permitting flow when said second manually operated throttle valve is in its closed position, and linkage means for interrelating said first and said second manually operated throttle valves for opening said second manually operated throttle valve in response to opening of said first manually operated throttle valve, said linkage means including a lost motion connection so that said second manually operated throttle valve is held in its closed position during a predetermined degree of opening of said first manually operated throttle valve.

12. An induction system as set forth in claim 11 wherein the linkage means is effective to cause the first and second manually operated throttle valves to reach their fully opened positions simultaneously.

13. An induction system as set forth in claim 11 further including a communicating passage extending between the first and second intake passages downstream of the second manually operated throttle valve.

14. An induction system as set forth in claim 13 wherein the communicating passage is positioned in close proximity to the first and second intake ports.

15. An induction system as set forth in claim 14 wherein the means for causing the primary portion of the idle and low speed charge requirements of the chamber to enter the chamber through the first intake port further including a third throttle valve in the second intake passage upstream of the communicating passage and means for automatically operating said third throttle valve.

16. An induction system as set forth in any of claims 11 through 15 wherein the intake passages are provided with a reversely bent portion so that the first throttle valve is juxtaposed to the second throttle valve and the flow past the first throttle valve is in the opposite direction to the flow past the second throttle valve.

17. An induction system for a chamber of an internal combustion engine comprising intake passage means having a first portion having an inlet at one end thereof and an outlet at the other end thereof for flow therethrough in a first direction from said inlet to said outlet, a juxtaposed substantially parallel extending second portion interconnected to said first portion by a curved section, said curved section having an inlet cooperating with said first portion outlet and an outlet cooperating with an inlet of said second portion juxtaposed to said first portion outlet for flow through said second portion in a direction opposite to said first direction, a first throttle valve positioned in said first portion, a second throttle valve positioned in said second portion and juxtaposed to said first portion, a linkage means for interconnecting said throttle valves for controlling the position of said second throttle valve in relation to the position of said first throttle valve.

* * * * *